Dec. 13, 1927.　　　　　　　　　　　　　　　　　　　　1,652,864
C. C. KINKER
GLASS JAR WIRE TYING MECHANISM
Filed Feb. 19, 1924　　　　6 Sheets-Sheet 1

Dec. 13, 1927.

C. C. KINKER

GLASS JAR WIRE TYING MECHANISM

Filed Feb. 19, 1924

Clarence E. Kinker
INVENTOR
BY
ATTORNEY

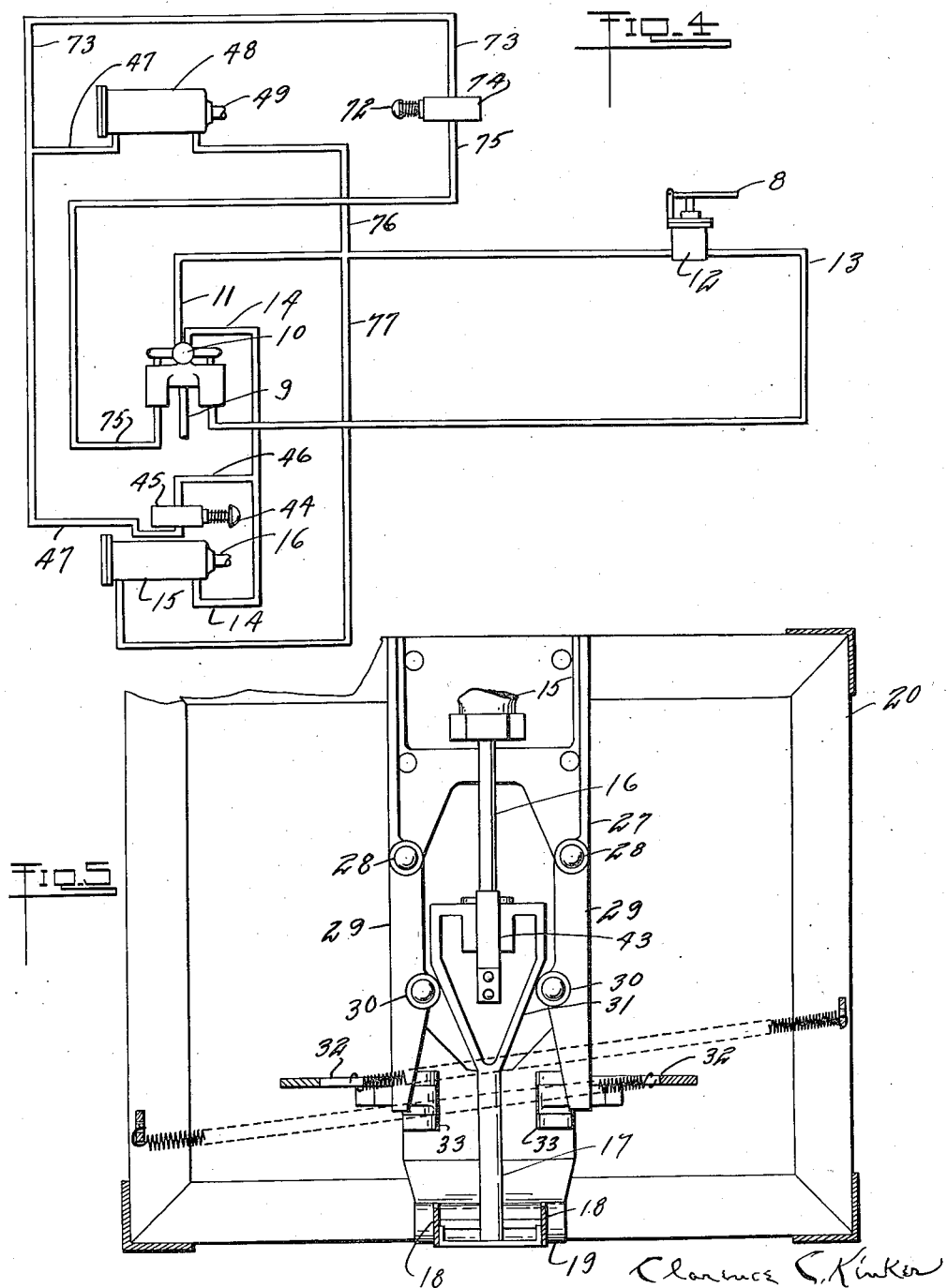

Dec. 13, 1927.
C. C. KINKER
1,652,864
GLASS JAR WIRE TYING MECHANISM
Filed Feb. 19, 1924   6 Sheets-Sheet 4
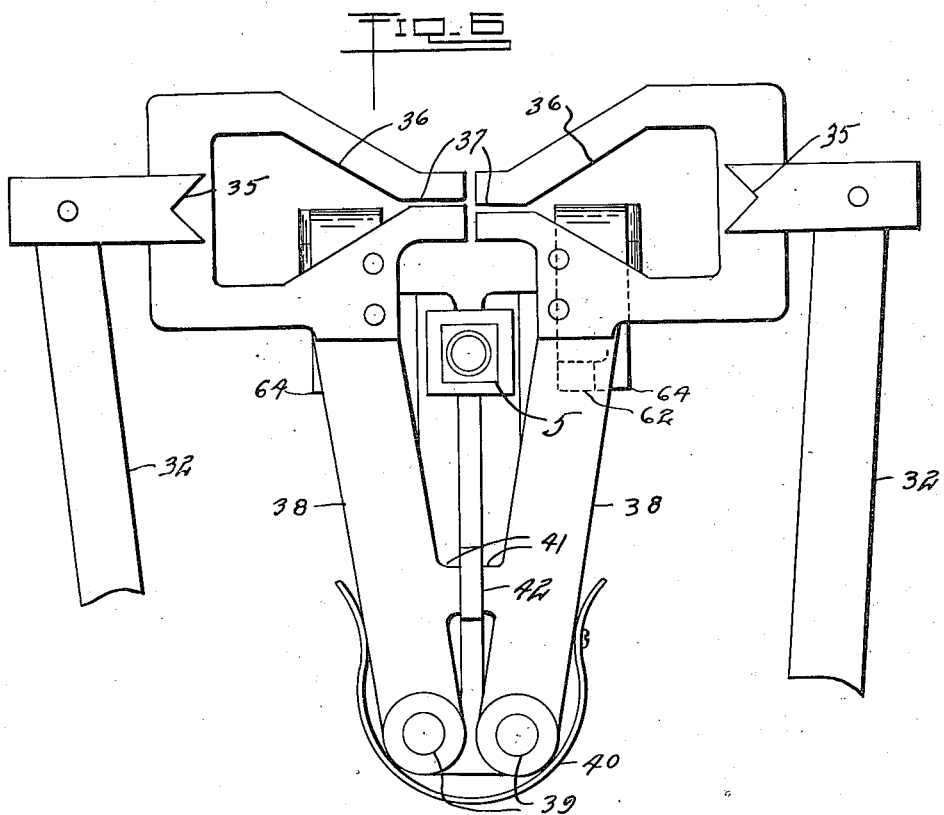
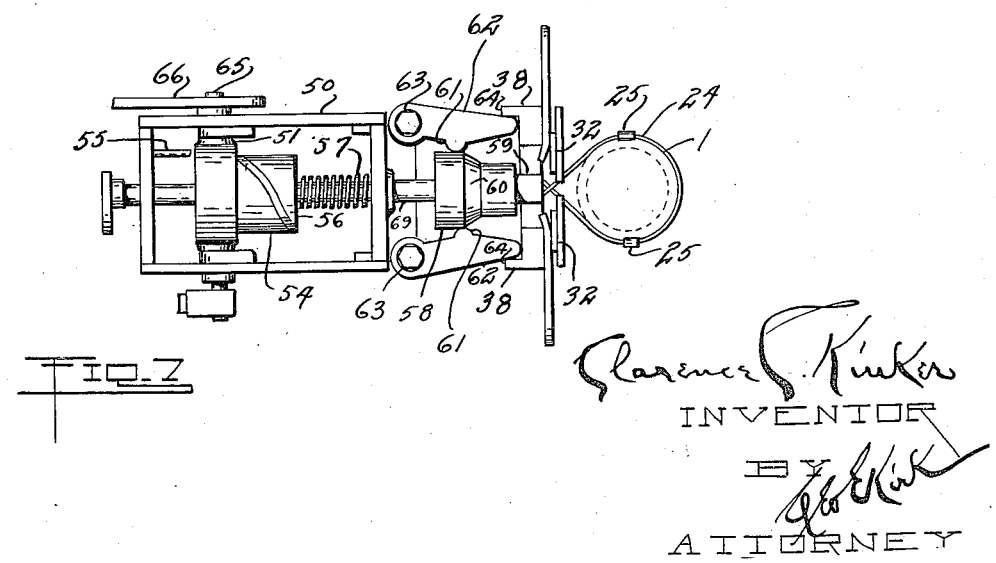
Clarence C. Kinker
INVENTOR
BY
ATTORNEY

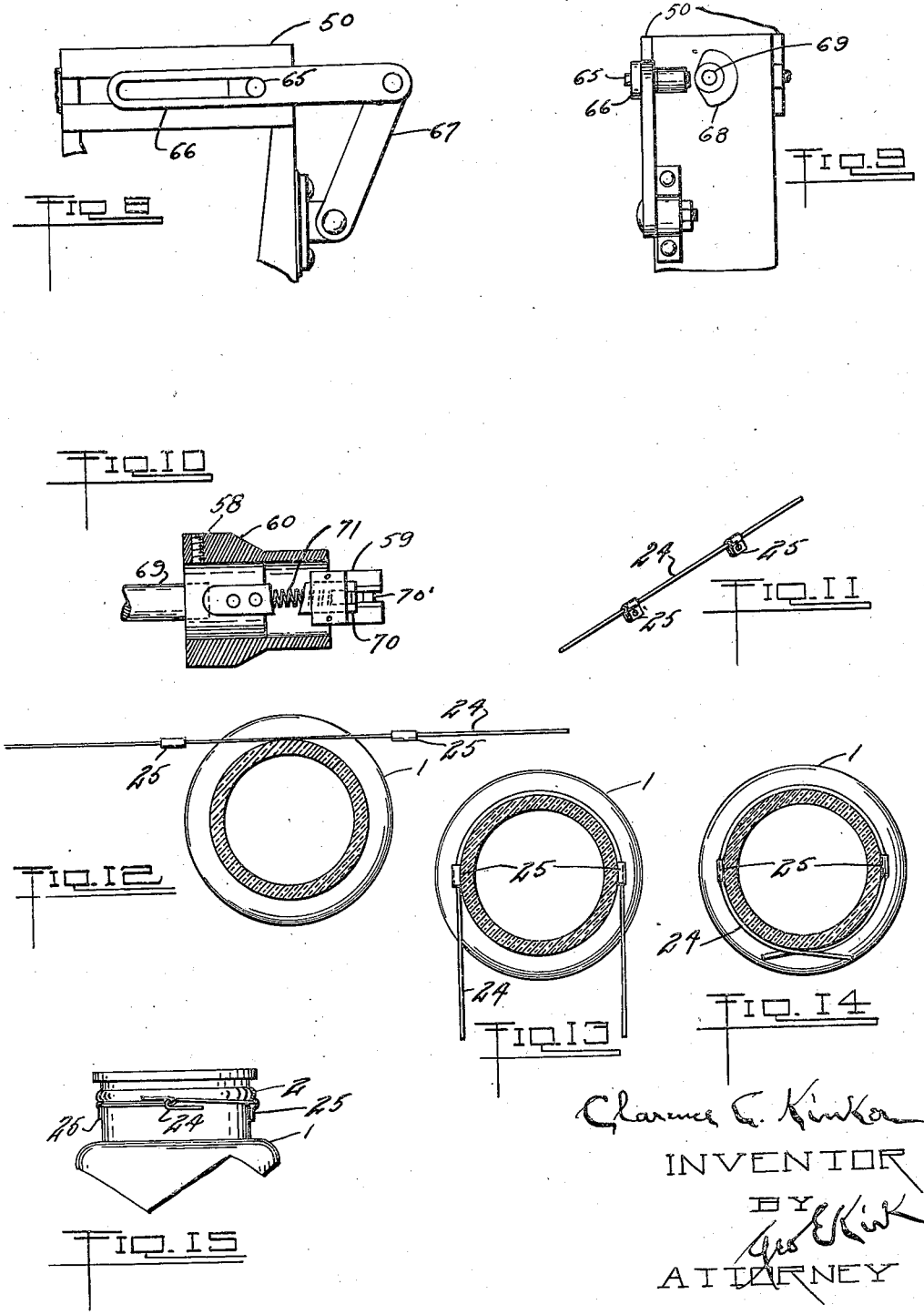

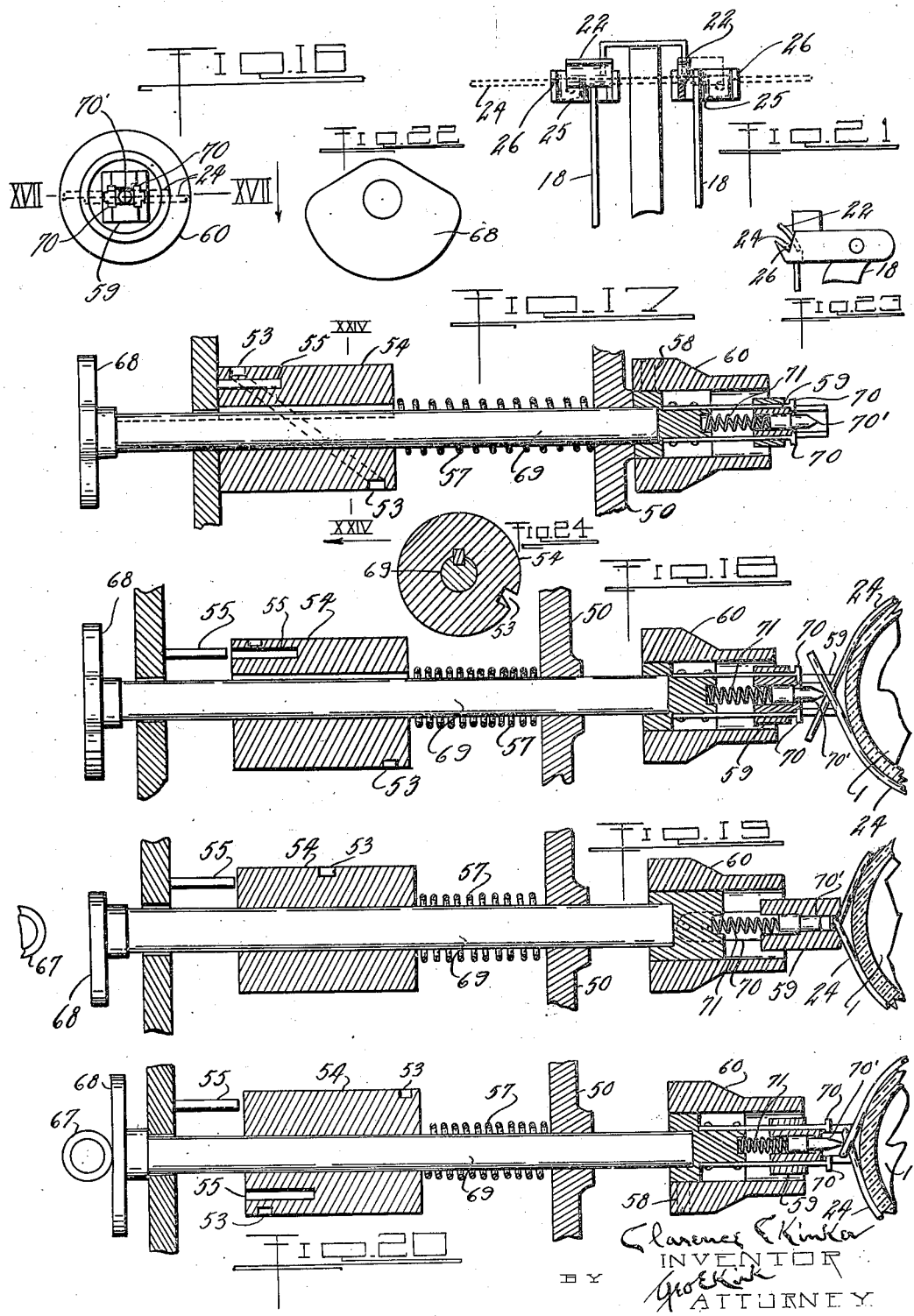

Patented Dec. 13, 1927.

1,652,864

UNITED STATES PATENT OFFICE.

CLARENCE C. KINKER, OF TOLEDO, OHIO, ASSIGNOR TO THE O'NEILL MACHINE COMPANY, OF TOLEDO, OHIO, A CORPORATION OF OHIO.

GLASS-JAR WIRE-TYING MECHANISM.

Application filed February 19, 1924. Serial No. 693,815.

This invention relates to tying machines.

This invention has utility when incorporated in a power operated wiring machine for affixing bail ear carrying rings on glass jars.

Referring to the drawings:—

Fig. 4 is a power diagram for the control connections of the machine of Fig. 1;

Fig. 5 is a section on the line V—V, Fig. 1, looking down on the power control for the wrapping mechanism for the machine;

Fig. 6 is a view on the line VI—VI, Fig. 1, looking in the direction of the arrow;

Fig. 7 is a fragmentary plan view showing the article after the completion of the wrapping operation and as the tying operation is started;

Fig. 8 is a fragmentary view of the tying device drive from the opposite side to the showing of Fig. 1;

Fig. 9 is a view of the features of Fig. 8 from the right thereof;

Fig. 10 is a section on the line X—X, Fig. 2, and on an enlarged scale;

Fig. 11 is a perspective view of the bail ear carrying strip or wire;

Fig. 12 is a view of the bail ear carrying strip or wire in position as to the jar before the wrapping operation is started;

Fig. 13 shows the folding of the wire or strip about the jar as the step after the showing in Fig. 12;

Fig. 14 shows the wire after the wrapping operation is completed and in readiness for the tying operation;

Fig. 15 shows the detail of the tied strip as about the glass jar neck;

Fig. 16 is a view looking into the jaw member of the tying means;

Fig. 17 is a section on the line XVII—XVII, Fig. 16 showing parts in position before the tying operation is started;

Fig. 18 is a view similar to Fig. 17, with the tying means advanced into engaged position with the free ends of the wire as crossed;

Fig. 19 shows the next step in operation of the tying means, as partially twisting the wire;

Fig. 20 shows the succeeding or final step in twisting the tying means;

Fig. 21 is a view looking into the wire holding means from the side of the tying means;

Fig. 22 is a view in side elevation of the cam at the left in Fig. 17;

Fig. 23 is a view in side elevation of the wire holding means of Fig. 21; and

Fig. 24 is a section on the line XXIV—XXIV, Fig. 17, looking in the direction of the arrow.

Figure 1:
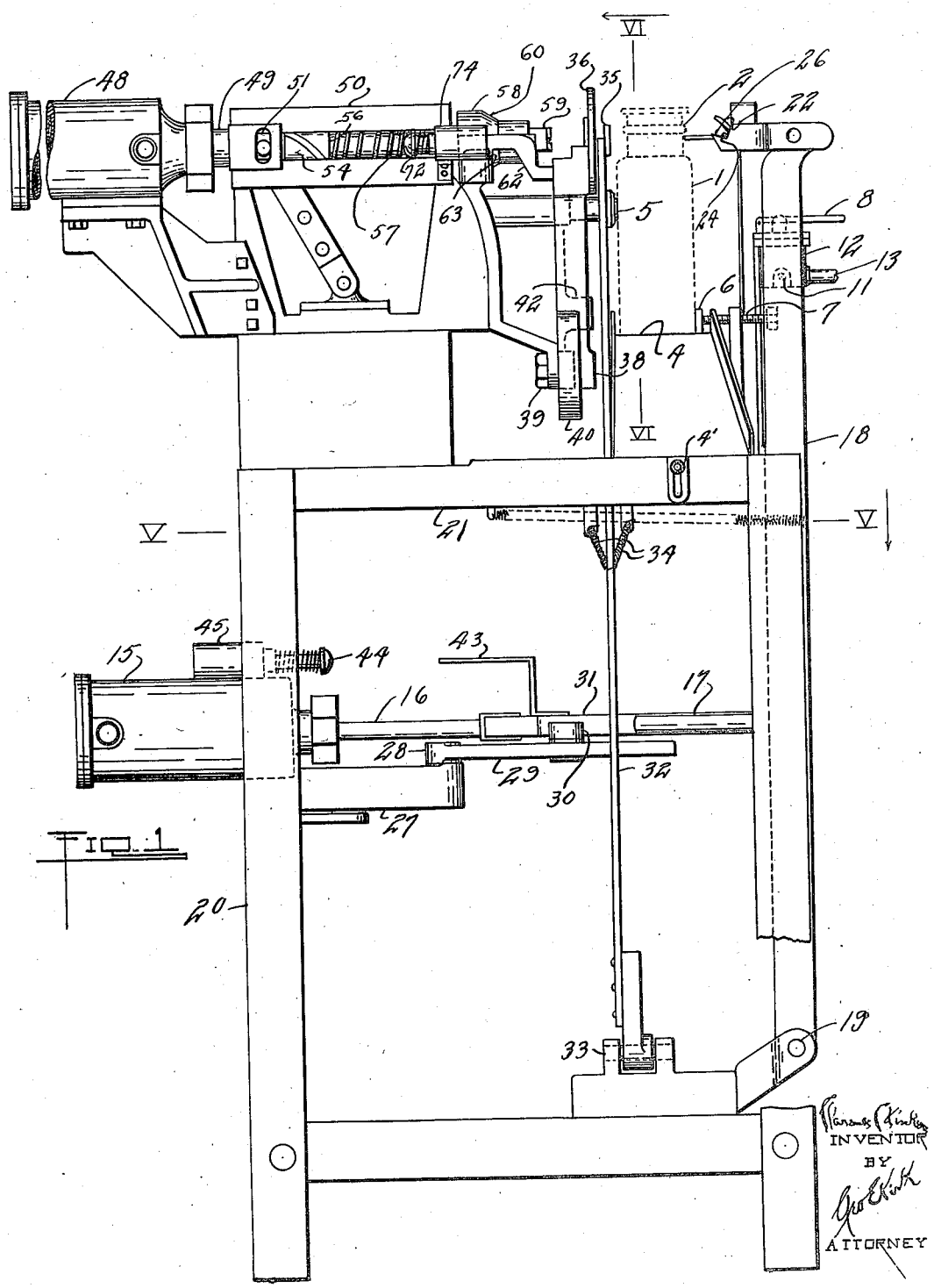
Fig. 1 is a side elevation, with parts broken away, showing an embodiment of the invention in a machine for tying bail ear carrying rings on glass jars.
Figure 2:
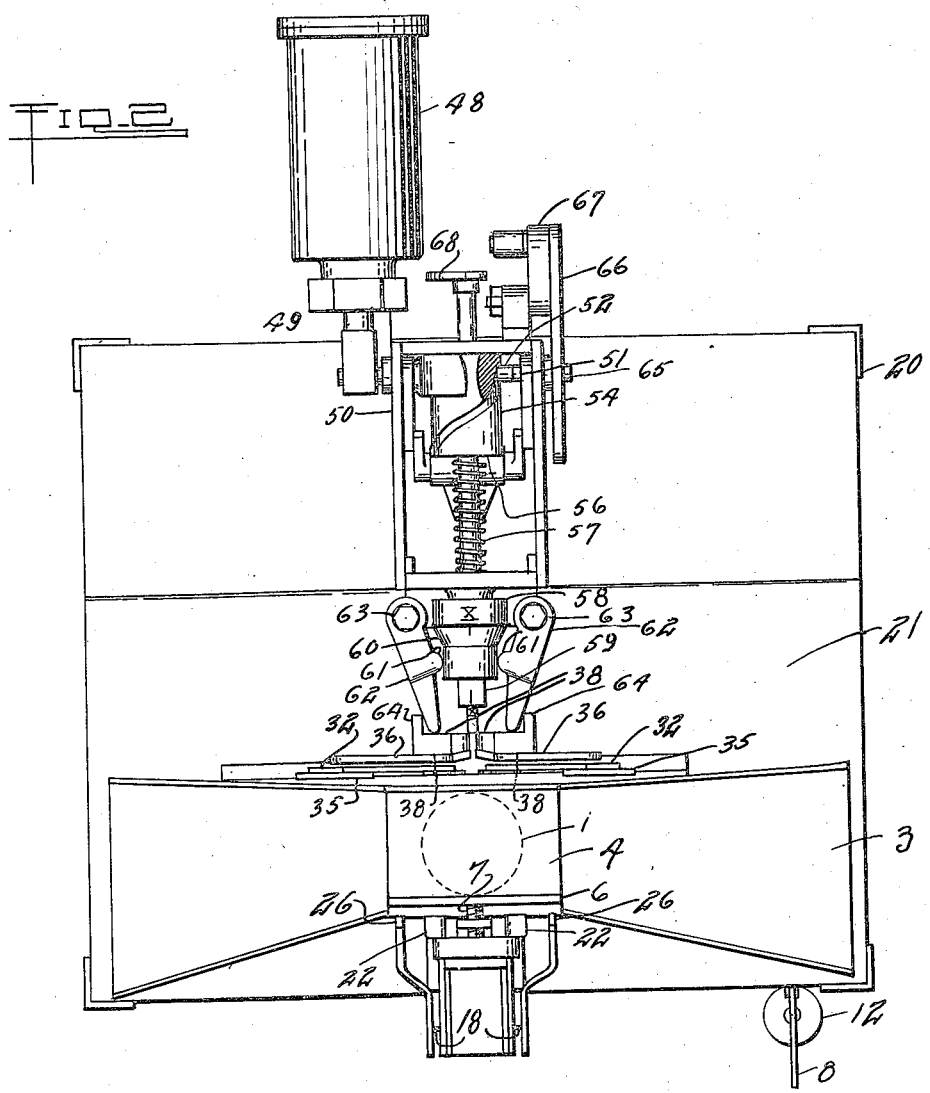
Fig. 2 is a plan view of the machine of Fig. 1, parts being broken away, the article being positioned for the machine to be started.

The article herein considered is a glass jar 1 shown as having a shoulder 2. This glass jar in operation hereunder may be shoved along way 3 (Fig. 2) to seat 4, there to have the side of this glass jar 1 come into position against rest 5 (Fig. 1). Bracket 6 may be adjusted for the set of jars to just touch against the base of the jar 1 by bolt 7 so that the jar is thus held in position for the folding and tying operation. Bolts 4' adjust the height of the seat 4. With this article or jar 1 thus placed in position, the operator may strike lever 8 (Figs. 1, 2, 4) and thereby connect power air from line 9 back of valve 10 to flow by line 11 past the valve 12 as controlled by this lever 8. This power air as passing the valve 12 may flow by line 13 to reset the rocker valve 10, so that power air from the line 9 now flows by line 14 to wrapping mechanism control cylinder 15, thereby effecting retraction of piston rod 16 into this cylinder 15.

Figure 3:
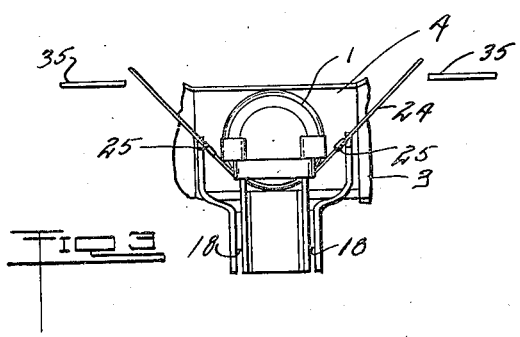
Fig. 3 is a fragmentary plan view of the machine with the lever and article in position for the folding operation which is started as to the strip of material to be wrapped around the glass jar.

This piston rod 16 has an extension 17. As this extension 17 is retracted, there follows it, lever 18 (Fig. 5) having fulcrum bearing 19. This action of this lever 18 is caused by tension spring 20' connected between the lever 18 and plate 21. The upper portion of this lever 18 carries a pair of guide cheeks 22. The tying operation as herein disclosed is effected by a wire or strip 24 carrying a pair of bail ears 25. This strip 24 is placed in hooks or open portion 26 carried by the upper end of this lever 18. In the initial travel operation, this wire strip 24 against the neck of bottle 1 is brought into U-shape about the upper portion of the article 1 just below the collar or shoulder 2 of this article (Figs. 3, 13) by the swinging of the portions 26 over the seat 4.

Carried by the frame 20 just below the piston rod 16 is a bracket 27 (Figs. 1, 5). This bracket 27 carries fulcrum bearings 28 for levers 29 having rollers 30 engaging wedge 31 carried by the piston rod 16. These levers 29 are engaged at their free ends to be held against the wedge 31 by the action of levers 32. These levers 32 are mounted in fulcrum bearings 33 in the lower portion of the frame 20. These levers are drawn toward each other by tension springs, which springs 34 in the operation in the withdrawal of the wedge 31 cause the levers 32 to work toward each other and thereby have the V-guide head portions 35 (Fig. 6) at the upper end of these levers 32, move toward each other. In this movement toward each other, the guide portions 35 engage the free ends of the strip, and cause such to move along converging guide ways 36 and into guide slots 37, one slightly above the other, there to be crossed ready for the tying operation as the folding operation is completed.

Each of these guides 36, 37, is mounted by arm 38 carried by a bearing 39 therebelow, (Fig. 6). These arms are held in position by a U-shaped spring clip 40 effective to keep the arms urged toward each other so that portions 41 thereof may come against ledge 42 and thereby hold the termini of the guides 36, 37, slightly spaced.

In this retracted travel of the piston rod 16 into the wrapping power cylinder 15, offset 43 travels with the piston rod 16 to come against plunger 44 of valve 45 (Figs. 1, 4) and thereby connects power air from the line 14 by branch 46, past this valve 45 to line 47, extending to tying mechanism operating cylinder 48 having piston rod 49 thereby thrust therefrom.

A guide 50 (Figs. 1, 2) is provided for crosshead 51 connected to be reciprocated by the piston rod 49. This crosshead 51 carries pin 52 coacting with way 53 in drum 54. As the piston rod 49 starts out of the cylinder 48, pin 55 (Fig. 7) coacts with the drum 54 to hold such drum from any twisting or rotation. Accordingly, in its initial travel the crosshead 51 is held by drum end 56 as acted upon by spring 57, to prevent excess thrusting forward of tie head 58 terminating in jaw 59. Accordingly this jaw 59 is thrust to engage the crossed ends of the tie wire 24.

During the travel forward of the head 58 its shoulder 60 coacts with the shoulder 61 on levers 62 having fulcra 63. Accordingly in this movement of the head 58 forward, this pair of levers 62 has their forward or free ends engaged with extensions or ears 64 on the arms 38 so that these arms 38 are simultaneously opened up to have the guides 37 clear the way as the jaw 59 moves up against the crossed ends of the wire 24 adjacent to the article 1.

This continued movement of the piston rod 49 clears the drum 54 from the pin 55 so that this further travel effects the rotation of the head 58 due to the pin 52 riding in the helical way 53. The extent of this rotation may be about five-eighths of a complete turn, and is effective in tying the wire against the article 1.

However, this tying operation is not thus completed for the crosshead 51 carries a pin 65 coacting with a slot in arm 66 (Figs. 7, 8) extending to rock-arm 67. The arm 67 in its movement toward the guide 50 contacts cam 68 on rod 69. This cam 68 is turned by the rotation of the drum 54 so that it is now in position to be engaged. As this cam 68 is engaged by the arm 67, this engagement, due to the continuation of the travel of the piston rod 49 effects thrusting of the rod 69 (Figs. 2, 10) with the tubular head 58 to thrust finger 70 on each side of the jaw 59 for directly flattening the crossed ends of the tied wires thereby making a more secure and snug as well as flatter tie or knot in the strip. Spring 71 permits the plunger 70' to shift as to the jaw 59. The spring 71 holds the plunger 70' into engagement with the crossed wire for the twisting. Furthermore, these yielding features automatically adapt the machine for handling ware and wire.

In this outward or forward travel of this piston rod 49, the crosshead 51 strikes the plunger 72 and thereby connects power air from the line 47 by way of line 73 past valve 74 to flow by line 75 to the rocker valve 10, thereby resetting such rocker valve 10 so that power air from the line 9 flows by way of the line 11 to the line 76 for effecting the retraction travel of the piston rod 49 back into starting position in the cylinder 48. This line 11 besides having the branch 76 has an additional branch 77 extending to the cylinder 15 thereby effecting shifting outward of the piston rod 16. The retraction of the piston rod 49 effects a resetting or recover of the tying mechanism and thereby withdraws the head 58 and jaw 59 away from the article as tied. The thrusting outward of the piston rod 16 effects a resettitng of the wrapping mechanism by rocking the holder 26 away from the tying mechanism and simultaneously swings the guides 35 outward. The article 1 with the tied wire about such article is now free and may be removed from the seat 4 and another article placed thereon. The operation may be accordingly repeated by having the operator again strike the lever 4. Thus we see that with one operation by the operator beyond placing the article in its seat and placing the wire in the holder, the entire mechanism is effective in completing the wrapping and tying operations.

What is claimed and it is desired to secure by United States Letters Patent is:—

1. A seat for an article, a holder for a strip to be tied about the article, means for operating the holder to bend the strip into U-shaped position about the article, strip end shifting guide means for effecting swinging of the strip ends together, additional moveable guide means into which the shifting guide means moves said strip ends, and tying means coacting with said ends.

2. A tying machine embodying a seat for an article, a strip holder laterally of said seat, strip end shifting guide means, end swinging guide means comprising strip end engaging levers pivotally mounted below the seat and upwardly extending adjacent the side of the seat away from the holder, tie means, and a power drive provided with connections for shifting the guide means in a vertical plane to bring the strip ends into proximity and including a cam drum and plunger device thereafter causing the tie means to operate on said ends.

3. A tying machine embodying a strip holder, means for positioning an article whereby a strip as mounted in the holder is foldable about said positioned article, guide means for the folded strip ends, a strip end engaging twister, a drum and plunger operator for the twister said guide means comprising levers pivotally mounted below the article and upwardly extending adjacent the twister for swinging in a vertical plane toward the twister, and a drive automatically controlling the twister drum and plunger operation as following the folding operation.

4. A tying machine embodying a seat for an article, a strip holder having an idle position at one side of said seat shiftable to fold a strip in the holder about the article, strip end shifting guides movable to further fold said strip into article embracing position and comprising a pair of levers pivotally mounted below said seat and upwardly extending on the side of said seat remote from the idle position of the holder, a power device for controlling the holder and guides, strip end engaging reciprocable head jaw means, a plunger, a cam for rotating the plunger and jaw means, and a second power drive for the plunger.

5. A tying machine embodying wrapping mechanism for a strip about an article comprising a folder and two pairs of horizontal axis levers, one pair directing strip ends into the other pair of levers as guides as the other pair moves into proximity for directing said ends of the wrapped strip into crossed position, a power drive for the levers, tying mechanism for the wrapped strip, a power drive for the tying mechanism, and control connections determining sequence for the tying mechanism operation after the wrapping mechanism operation.

6. A way provided with a seat for an article, a movable holder for bending to parallel-leg U-form a strip to be tied about the article, a power device for timing the shifting of the strip by the holder into U-shaped position about the article, additional means mounted at the opposite side of the article from the bend of the U-form strip and there movable for shifting the free ends of the strip horizontally toward each other in a horizontally shifting region, means for adjusting the seat toward and from said horizontally shifting region for the strip for positioning an article as to the strip, and power means including strip end engaging jaw means, and a spreader timed to thrust against and to tie the ends of said strip about the article.

7. A tying machine embodying wrapping mechanism for a strip about an article comprising a folder for a strip about an article and in addition thereto strip end shifting guide means, a first yieldable drive for operating said folder and guide means in sequence, tying mechanism for the wrapped strip, and a second independently operable yieldable drive having power control from the first drive for operating the tying mechanism.

8. A tying machine embodying wrapping mechanism for a strip about an article, comprising a strip holder shiftable relatively to the article to effect folding and strip end shifting guide means movable to effect crossing of the free ends of the strip, a first yieldable drive for operating said folder and guide means in sequence, tying mechanism for the wrapped strip, a second yieldable drive for operating the tying mechanism, and control connections for the drives tripped by the operation of the first drive for thereafter effecting operation of said second drive.

9. A tying machine embodying wrapping mechanism for a strip about an article, a first yieldable drive for operating said wrapping mechanism, a control carried by said first drive, tying mechanism for the wrapped strip, a second yieldable drive for operating the tying mechanism, means for tripping said control as the wrapping operation is effected, and connections from said control for controlling the second drive to effect operation in sequence thereafter of the tying mechanism.

10. A tying machine embodying wrapping mechanism for a strip about an article, a first drive for yieldably operating said wrapping mechanism, tying mechanism for the wrapped strip, a second drive for yieldably operating the tying mechanism, and a first control carried by the wrapping mechanism drive, a second control carried by the tying mechanism second drive, control connections from said controls whereby the wrapping mechanism first control may effect operation of the tying mechanism second drive, and the tying mechanism control may effect resetting of both the tying mechanism and the wrapping mechanism, and a starting third control in said connections for said machine.

In witness whereof I affix my signature.

CLARENCE C. KINKER.